(12) United States Patent
Hirakawa et al.

(10) Patent No.: US 9,383,867 B2
(45) Date of Patent: Jul. 5, 2016

(54) TOUCH DISPLAY HAVING PROXIMITY SENSOR ELECTRODE PAIR WITH EACH ELECTRODE FORMED ON THE TOP FACE OF THE DISPLAY PANEL SO AS TO OVERLAP THE DISPLAY REGION

(75) Inventors: Masaya Hirakawa, Kyoto (JP); Shigehide Yano, Kyoto (JP)

(73) Assignee: ROHM CO., LTD. (JP)

( * ) Notice: Subject to any disclaimer, the term of this patent is extended or adjusted under 35 U.S.C. 154(b) by 475 days.

(21) Appl. No.: 13/505,945

(22) PCT Filed: Nov. 2, 2010

(86) PCT No.: PCT/JP2010/006465
§ 371 (c)(1),
(2), (4) Date: Jul. 12, 2012

(87) PCT Pub. No.: WO2011/055534
PCT Pub. Date: May 12, 2011

(65) Prior Publication Data
US 2012/0268422 A1 Oct. 25, 2012

(30) Foreign Application Priority Data
Nov. 9, 2009 (JP) .................. 2009-256486

(51) Int. Cl.
*G06F 3/044* (2006.01)
*G06F 1/32* (2006.01)

(52) U.S. Cl.
CPC ............. *G06F 3/044* (2013.01); *G06F 1/3203* (2013.01); *G06F 1/3287* (2013.01); *G06F 2203/04108* (2013.01); *Y02B 60/1282* (2013.01)

(58) Field of Classification Search
CPC ................. Y02B 60/1289; G06F 2203/04101; G06F 2203/04106; G06F 2203/04108; G06F 2203/04111; G06F 3/0412; G06F 3/044

USPC ..................... 345/173–184; 178/18.03–19.07
See application file for complete search history.

(56) References Cited

U.S. PATENT DOCUMENTS

2006/0244733 A1* 11/2006 Geaghan ........................ 345/173
2007/0222766 A1* 9/2007 Bolender ....................... 345/173
(Continued)

FOREIGN PATENT DOCUMENTS

| JP | 11-39093 A | 2/1999 |
|----|------------|--------|
| JP | 11-232034 A | 8/1999 |

(Continued)

OTHER PUBLICATIONS

International Preliminary Report on Patentability for International Application No. PCT/JP2010/006465, issued Jun. 12, 2012, with English translation.

(Continued)

*Primary Examiner* — Chanh Nguyen
*Assistant Examiner* — Navin Lingaraju
(74) *Attorney, Agent, or Firm* — Cantor Colburn LLP (57) ABSTRACT

Multiple sensor electrodes are formed such that they overlap a display panel, and each have an electrostatic capacitance that changes according to the user's touch. Furthermore, a proximity sensor electrode pair is formed as a transparent electrode such that they overlap the display panel. An electrostatic capacitance detection circuit detects change in the electrostatic capacitance of each sensor electrode due to the user's touch, thereby detecting a position touched by the user. A proximity detection circuit detects change in the electric field generated between the proximity sensor electrode pair due to the proximity of the user, thereby detecting the proximity of the user to the display panel. An electrostatic capacitance detection circuit is configured to have at least a component that is switchable between an operating state and a non-operating state. When detecting that the user is in proximity, this component transits from the non-operating state to the operating state.

8 Claims, 5 Drawing Sheets

(56) References Cited

U.S. PATENT DOCUMENTS

| | | | |
|---|---|---|---|
| 2008/0266271 A1* | 10/2008 | Van Berkel et al. | 345/174 |
| 2008/0297174 A1* | 12/2008 | Narasimhan | G06F 3/044 324/663 |
| 2009/0096762 A1* | 4/2009 | Hinata | 345/174 |
| 2009/0284465 A1* | 11/2009 | Oki et al. | 345/156 |
| 2010/0026656 A1* | 2/2010 | Hotelling et al. | 345/174 |
| 2010/0149125 A1* | 6/2010 | Klinghult et al. | 345/174 |
| 2010/0149126 A1* | 6/2010 | Futter | 345/174 |
| 2010/0301879 A1* | 12/2010 | Philipp | 324/679 |
| 2010/0309171 A1* | 12/2010 | Hsieh et al. | 345/204 |
| 2011/0096024 A1* | 4/2011 | Kwak | 345/174 |

FOREIGN PATENT DOCUMENTS

| | | |
|---|---|---|
| JP | 2001-325858 A | 11/2001 |
| JP | 2003-511799 A | 3/2003 |
| JP | 2007-13432 A | 1/2007 |
| JP | 2009-116849 A | 5/2009 |
| KR | 2009-0106109 A * 10/2009 | G06F 3/041 |
| WO | 2008/093683 A1 | 1/2008 |

OTHER PUBLICATIONS

International Search Report for International Application No. PCT/JP2010/006465, mailed Dec. 7, 2010, with English translation.

* cited by examiner

COMPARISON TECHNIQUE

|  | EN1 | EN2 | EN3 | EN4 |
|---|---|---|---|---|
| $S2_1$ | 1 | 0 | 1 | 0 |
| $S2_2$ | 0 | 1 | 1 | 0 |
| $S2_3$ | 1 | 0 | 0 | 1 |
| $S2_4$ | 0 | 1 | 0 | 1 |

TOUCH DISPLAY HAVING PROXIMITY SENSOR ELECTRODE PAIR WITH EACH ELECTRODE FORMED ON THE TOP FACE OF THE DISPLAY PANEL SO AS TO OVERLAP THE DISPLAY REGION

CROSS REFERENCE TO RELATED APPLICATIONS

This is a U.S. national stage of application No. PCT/JP2010/006465, filed on 2 Nov. 2010. Priority under 35 U.S.C. §119(a) and 35 U.S.C. §365(b) is claimed from Japanese Application No. 2009-256486, filed 9 Nov. 2009, the disclosure of which are also incorporated herein by reference.

BACKGROUND OF THE INVENTION

1. Field of the Invention

The present invention relates to a display apparatus furnished with a touch sensor.

2. Description of the Related Art

In recent years, electronic devices such as computers, cellular phone terminals, PDAs (Personal Digital Assistants), etc., include a touch sensor (which is also referred to as a "touchpad" or "trackpad"), which allows the user to operate the electronic device by touching the input device with a finger or fingers.

Such touch sensors are roughly classified into two types, i.e., electrostatic capacitive touch sensors and resistive film touch sensors. Electrostatic capacitive touch sensors include multiple sensor electrodes arranged along the X-axis direction, multiple sensor electrodes arranged along the Y-axis direction, and a detection circuit configured to detect the electrostatic capacitance of each sensor electrode. The electrostatic capacitance generated between each sensor electrode and its surroundings changes in response to the user's touch. The detection circuit detects the sensor electrode of which the electrostatic capacitance has changed due to the user's touch, thereby detecting the position touched by the user.

RELATED ART DOCUMENTS

Patent Documents

[Patent Document 1]
 Japanese Patent Application Laid Open No. 2001-325858
[Patent Document 2]
 PCT Japanese Translation Patent Publication No. 2003-511799
[Patent Document 3]
 U.S. Pat. No. 5,825,352 A1 Specification
[Patent Document 4]
 Japanese Patent Application Laid Open No. 2007-013432
[Patent Document 5]
 Japanese Patent Application Laid Open No. H11-232034

Standby power consumption is an important consideration in battery driven mobile devices, in that there is a demand for a mechanism for operating a high power consumption device only as needed. With such a touch sensor, the operation mechanism thereof is such that there is a need to continuously monitor the electrostatic capacitance of each sensor electrode, which has a tendency to lead to high current consumption. Thus, there is a demand for a technique for reducing such current consumption.

One approach to reducing the power consumption of the touch sensor is to employ a combination of such a touch sensor and a mechanical switch. That is to say, switching of the detection circuit of the touch sensor between the standby state and the operating state is performed according to the state of the mechanical switch. However, such a mechanical switch arranged as an additional component is detrimental to the advantages of a thin shape (compact size) and improved design.

Furthermore, as another approach to reducing power consumption using a touch sensor alone, a method has been proposed in which an electrostatic capacitance detection operation is intermittently performed for each of the multiple sensor electrodes. With such a method, the stopped period and the detection period are alternately repeated. As the stopped period becomes longer, the power consumption becomes lower. However, with such an arrangement, there is a tradeoff between reduced power consumption and reduced sensor responsiveness. Accordingly, there is a limit in the extent to which this approach reduces power consumption.

SUMMARY OF THE INVENTION

The present invention has been made in order to solve such a problem. Accordingly, it is an exemplary purpose of an embodiment of the present invention to provide a touch sensor having a reduced power consumption.

An embodiment of the present invention relates to a display apparatus. The display apparatus comprises: a display module having a touch sensor; an electrostatic capacitance detection circuit; and a proximity detection circuit. The display module having a touch sensor comprises: a display panel; multiple sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel. The electrostatic capacitance detection circuit is configured to detect change in the electrostatic capacitance that occurs at each of the multiple sensor electrodes according to being touched by the user so as to detect a position touched by the user. The proximity detection circuit is configured to detect change in the electric field generated between the proximity sensor electrode pair, which corresponds to the user being in proximity thereto, so as to detect the user being in proximity to the display panel.

The electrostatic capacitance detection circuit is configured to have at least a component that is switchable between an operating state and a non-operating state. When detecting the proximity of the user by means of the proximity detection circuit, the at least one component transits from the non-operating state to the operating state.

The proximity sensor electrode pair and the proximity detection circuit form an electric field proximity sensor. Such an electric field proximity sensor requires lower power consumption than that required by a touch sensor that comprises sensor electrodes and an electrostatic capacitance detection circuit. Thus, by detecting the proximity of the user's finger or fingers or a pen (which will be simply referred to as the "user" hereafter) by means of the electric field proximity sensor, and by operating the touch sensor when it is detected that the user is in proximity thereto, such an arrangement provides reduced power consumption as compared with an arrangement configured to continuously operate the touch sensor. Furthermore, the proximity sensor electrode pair is arranged such that the electrodes overlap the display panel. Thus, such an arrangement allows a device mounting such a display apparatus to have a small size as compared with an arrangement including a mechanical switch arranged in the outer region of the display panel, which is used to detect the proximity of the user, or an arrangement including a proximity sensor electrode pair arranged in the outer region of the display panel.

Also, the display panel may be partitioned into multiple regions. The proximity sensor electrode pair may be provided for each of the multiple regions thus partitioned. Also, the proximity detection circuits may be each configured to detect, for the respective regions, whether or not the user is in proximity thereto. Also, the electrostatic capacitance detection circuit may be configured to execute electrostatic capacitance detection processing for the sensor electrodes that correspond to a region where it has been detected that the user is in proximity thereto. Alternatively, the electrostatic capacitance detection circuit may include multiple components respectively arranged for the multiple regions, and each configured to be independently switchable between the operating state and the non-operating state. Each of the components of the electrostatic capacitance detection circuit may be switched between the operating state and the non-operating state according to change in the electric field between the proximity sensor electrode pair that belongs to a corresponding region from among the multiple regions.

By switching the electrostatic capacitance detection circuit between the operating state and the non-operating state for each of the multiple regions, such an arrangement is capable of reducing power consumption with higher efficiency.

Also, the display panel may be partitioned into four regions each comprising two rows and two columns. Also, the electric field generating electrode may be arranged at the center of the four regions. Also, the electric field detection electrodes may be each arranged in the vicinity of the respective corners of the four regions that are opposite to the electric field generating electrode.

Another embodiment of the present invention relates to an electronic device. The electronic device comprises a display apparatus according to any one of the aforementioned embodiments. Such an electronic device provides increased battery driving time. Furthermore, such an embodiment allows the electronic device to have a smaller size.

Yet another embodiment of the present invention relates to a control circuit for a display module furnished with a touch sensor. The display module comprises: a display panel; multiple sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel, and configured to generate an electric field between these two electrodes. The control circuit comprises an electrostatic capacitance detection circuit configured to detect change in the electrostatic capacitance that occurs at each of the multiple sensor electrodes so as to detect a position touched by a user, and comprising at least a component that is switchable between an operating state and a non-operating state. The electrostatic capacitance detection circuit is connected to a proximity detection circuit configured to detect the user being in proximity to the display panel by monitoring change in the electric field generated between the proximity sensor electrode pair. The aforementioned component of the electrostatic capacitance detection circuit is configured to switch from the non-operating state to the operating state upon detection by means of the proximity detection circuit that the user is in proximity thereto.

Such an embodiment provides reduced power consumption of the touch sensor.

Yet another embodiment of the present invention relates to a display module furnished with a touch sensor. The display module comprises: a display panel; multiple sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel.

With such an embodiment, the proximity sensor electrode pair is arranged such that the electrodes overlap the display panel. Thus, such an arrangement allows an electronic device to have a small size as compared with an arrangement including a mechanical switch arranged in the outer region of the display panel, which is used to detect the proximity of the user, or an arrangement including a proximity sensor electrode pair arranged in the outer region of the display panel.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
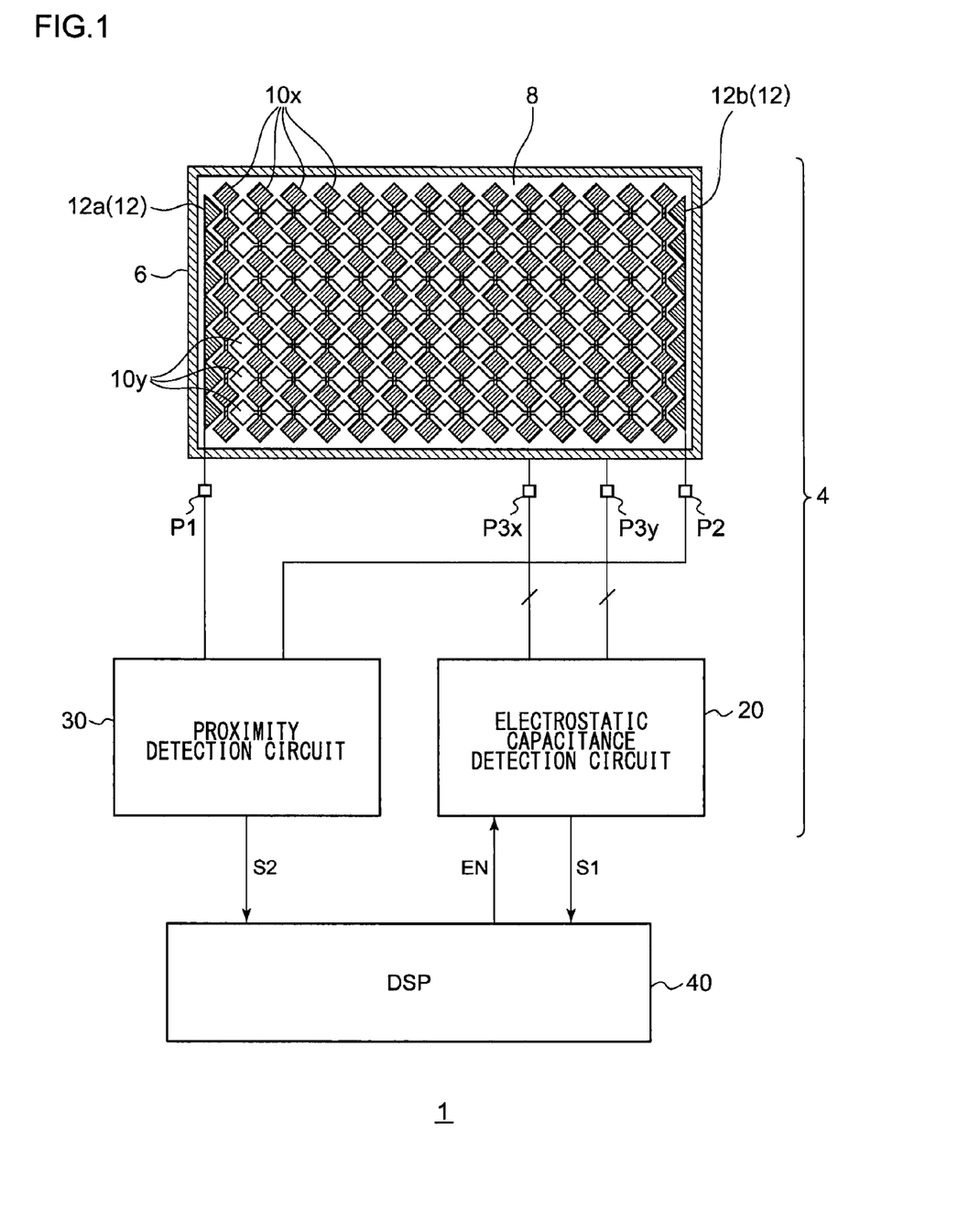
FIG. 1 is a block diagram which shows an overall configuration of an electronic device including a display apparatus according to an embodiment.

FIG. 1 is a block diagram which shows an overall configuration of an electronic device including a display apparatus according to an embodiment. An electronic device 1 is configured as a battery driven device such as a cellular phone terminal, a PDA, a digital still camera, a digital video camera, a laptop PC (Personal Computer), etc., and includes a display apparatus 4 and a DSP 40. The display apparatus 4 is configured as a liquid crystal display, an organic EL display, a plasma display, or the like, and is configured to provide the user with various kinds of information in the form of images. The DSP 40 integrally controls the overall operation of the electronic device 1, and performs various kinds of signal processing.

The display apparatus 4 is configured as a touch panel having a touch sensor function. The display apparatus 4 has both a function as a display and a function as an input device. Upon the user touching or pressing the surface of the display apparatus 4 with a finger or fingers, or a pen, the display apparatus 4 detects the coordinate point of the touched point, the trajectory of the touched points, or a combination of the coordinate point and the trajectory (which will also be referred to as a "gesture").

The display apparatus 4 includes an electrostatic capacitive touch sensor. The power consumption of such a touch sensor is high, and thus has an effect on the driving time of a battery driven device. Description will be made below regarding a technique which allows the electronic device 1 to have an increased driving time and/or a technique which allows the electronic device 1 to be miniaturized.

The display apparatus 4 includes a display module 6, an electrostatic capacitance detection circuit 20, and a proximity detection circuit 30. The electrostatic capacitance detection circuit 20 will also be referred to as the "touch panel control IC".

The display module 6 includes a display panel 8, multiple sensor electrodes 10, and a proximity sensor electrode pair 12.

The display panel 8 is configured as a liquid crystal panel, an organic EL panel, or the like, and is configured to be driven according to signals received from an unshown source drier (data driver) and an unshown gate driver (scanning driver). The sensor electrodes 10 and the electrostatic capacitance detection circuit 20 form a touch sensor. The proximity sensor electrode pair 12 and the proximity detection circuit 30 form a contactless electric field proximity sensor.

The multiple sensor electrodes 10 are formed in a region on the top face of the display panel 8 such that they overlap the display region of the display panel 8. Electrostatic capacitance occurs between each sensor electrode 10 and its surroundings. The electrostatic capacitance changes due to change in the positions of the sensor electrodes 10 according to the user touch state.

The proximity sensor electrode pair 12 includes an electric field generating electrode 12a and an electric field detection electrode 12b. The electric field generating electrode 12a and the electric field detection electrode 12b are each formed on the top face of the display panel 8 such that they overlap the display region of the display panel 8. An electric field is generated between the electric field generating electrode 12a and the electric field detection electrode 12b according to a signal received from the proximity detection circuit 30 described later. When the user's finger or a pen is in proximity to the surface of the display panel 8, turbulence occurs in the electric field.

A modification may be made with respect to the layout of the electric field generating electrode 12a and the electric field detection electrode 12b, as described later. For example, an arrangement may be made in which the electric field generating electrode 12a is formed along a first edge of the display panel 8, and the electric field detection electrode 12b is formed along a second edge that is opposite to the first edge of the display panel 8.

The multiple sensor electrodes 10 and the proximity sensor electrode pair 12 are each configured as a transparent electrode such as an ITO (Indium Tin Oxide) electrode such that they do not impair the visibility of video images and still images displayed on the display panel 8. The sensor electrodes 10 and the proximity sensor electrode pair 12 may be formed in the same wiring layer, or may be formed in separate wiring layers.

A transparent protection layer is formed on the upper surface of the sensor electrodes 10 and the proximity sensor electrode pair 12.

The display panel 8 includes an electric field generating electrode terminal P1, an electric field detection electrode terminal P2, multiple sensor electrode terminals P3x arranged in columns, and multiple sensor electrodes terminals P3y arranged in rows.

The multiple sensor electrodes 10 are classified into X electrodes 10x (shaded) and Y electrodes 10y (white). The X electrodes 10x in the same column are connected together so as to form a common X electrode, which is connected to the sensor electrode terminal P3x of the corresponding column. Furthermore, the Y electrodes 10y in the same row are connected together so as to form a common Y electrode, which is connected to the sensor electrode terminal P3y of the corresponding row.

The electric field generating electrode terminal P1 is connected to the electric field generating electrode 12a. The electric field detection electrode terminal P2 is connected to the electric field detection electrode 12b.

The above is the configuration of the display panel 8 according to the embodiment.

The electrostatic capacitance detection circuit 20 is connected to the multiple sensor electrode terminals P3x and P3y.

The electrostatic capacitance detection circuit 20 has a configuration including at least a component configured to be switchable between an operating state $\phi_{ON}$ and a non-operating state $\phi_{OFF}$. When an enable signal EN input to the enable terminal EN is asserted (set to high level), such a component is set to the operating state $\phi_{ON}$, and when the enable signal EN is negated (set to low level), such a component is set to the non-operating state $\phi_{OFF}$ (standby state). In the operating state $\phi_{ON}$, the electrostatic capacitance detection circuit 20 detects change that occurs in the electrostatic capacitance of each of the multiple sensor electrodes 10 due to the user's touch, and detects the position (touched position) touched by the user. The electrostatic capacitance detection circuit 20 sequentially scans the multiple X electrodes, and monitors changes in capacitance that occur at each of the X electrodes. In the same way, the electrostatic capacitance detection circuit 20 sequentially scans the multiple Y electrodes, and monitors changes in the capacitance that occur at each of the Y electrodes. The electrostatic capacitance detection circuit 20 should be configured using known techniques, and the configuration thereof is not restricted in particular. The electrostatic capacitance detection circuit 20 outputs, to a DSP 40, a detection signal S1 which represents the capacitance, or otherwise the change in capacitance, that occurs at each sensor electrode 10. The DSP 40 detects the X coordinate and the Y coordinate of a touched position based upon the detection signal S1, or identifies the gesture thus input.

In the non-operating state $\phi_{OFF}$, the electrostatic capacitance detection circuit 20 stops the operation for scanning the sensor electrodes 10. In this period, the electrostatic capacitance detection circuit 20 requires only very low power consumption.

The proximity detection circuit 30 is connected to the electric field generating electrode terminal P1 and the electric field detection electrode terminal P2. The configuration of the proximity detection circuit 30 is also not restricted in particular. The proximity detection circuit 30 should be configured using known techniques. For example, the proximity detection circuit 30 includes a driver configured to apply an AC driving signal to the electric field generating electrode terminal P1 and a sensor amplifier configured to detect the electrical state of the electric field detection electrode 12b. By means of the driving operation of such a driver, an electric field is generated between the electric field generating electrode 12a and the electric field detection electrode 12b. By monitoring the electrical state of the electric field detection electrode 12b, such an arrangement detects a disturbance in the electric field that occurs due to the proximity of the user. The proximity detection circuit 30 and the electrostatic capacitance detection circuit 20 may be configured as separate chips, or may be configured as a single chip.

A signal S2 that represents the state of the electric field is input to the DSP 40. The DSP 40 detects the proximity of the user's finger or fingers, or a pen, based upon the detection signal S2. When the user is not in proximity, the DSP 40 negates the enable signal EN to be supplied to the electrostatic capacitance detection circuit 20. During a period in which the enable signal EN is negated, the operation of the touch sensor is stopped. When detecting the proximity of the user, the DSP 40 asserts the enable signal EN, which switches the electrostatic capacitance detection circuit 20 from the non-operating state to the operating state. It should be noted that the enable signal EN to be supplied to the electrostatic capacitance detection circuit 20 may be generated by the proximity detection circuit 30, instead of the DSP 40.

The above is the configuration of the electronic device 1. Next, description will be made regarding the operation thereof.

Figure 2A:
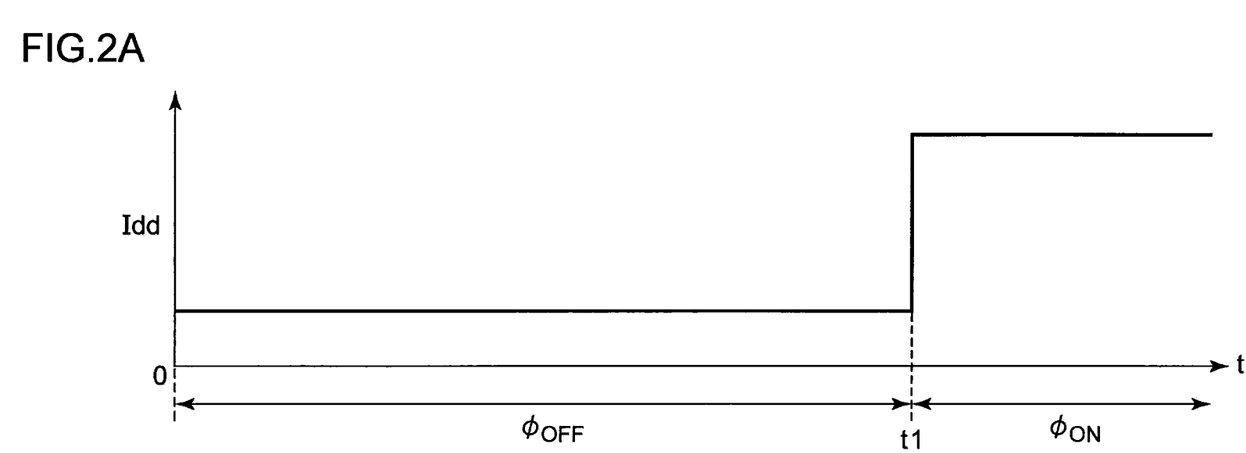
FIGS. 2A and 2B are time charts which respectively show the consumed currents required by the display apparatus shown in FIG. 1 and a display apparatus according to a comparison technique.
Figure 2B:
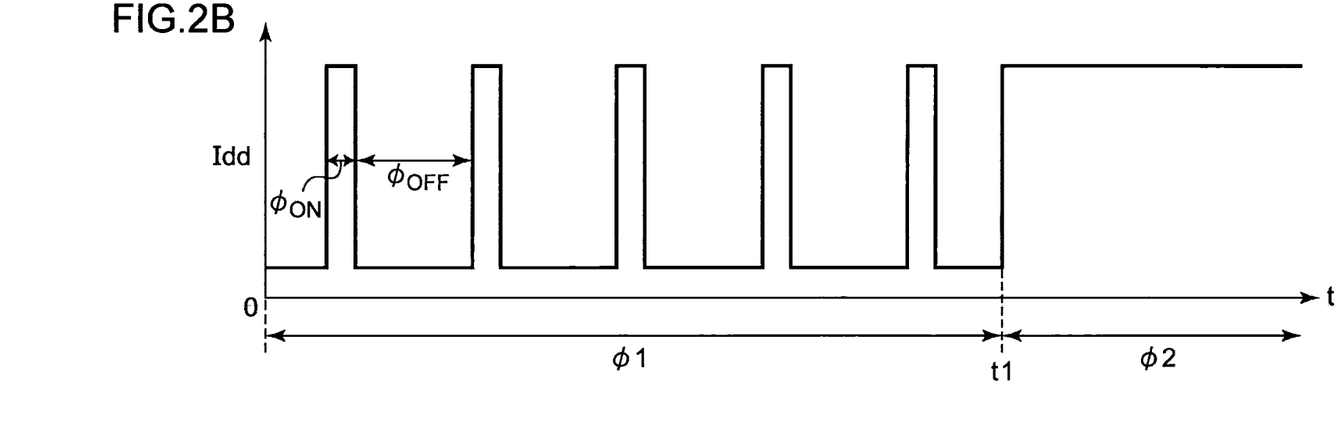

FIGS. 2A and 2B are time charts which show the respective consumed currents Idd required by the display apparatus shown in FIG. 1 and a display apparatus according to an comparison technique. In order to clarify the effects of the present embodiment, description will be made regarding the comparison technique with reference to FIG. 2B.

With such a comparison technique, the electrostatic capacitance detection circuit is configured to be switchable between an intermittent mode φ1 and a continuous mode φ2. The electrostatic capacitance detection circuit 20 includes a timer circuit as a built-in component. In the intermittent mode φ1, the electrostatic capacitance detection circuit 20 repeatedly executes the operating state $\phi_{ON}$ and th'e non-operating state $\phi_{OFF}$ according to a predetermined cycle and a predetermined duty ratio in a time sharing manner. In the operating state $\phi_{ON}$, the electrostatic capacitance detection circuit 20 requires relatively high current consumption. In the non-operating state $\phi_{OFF}$, the electrostatic capacitance detection circuit 20 requires only low current consumption. The current consumption required in the non-operating state $\phi_{OFF}$ is mainly due to the operation of the timer circuit included in the electrostatic capacitance detection circuit. In the intermittent mode φ1, upon detection of the user's touch, the mode is switched to the continuous mode φ2. In the continuous mode φ2, the electrostatic capacitance that occurs at each sensor electrode 10 is continuously monitored, leading to increased power consumption being continuously required.

Next, description will be made with reference to FIG. 2A regarding the operation of the display apparatus according to the embodiment. First, the electrostatic capacitance detection circuit 20 is set to the non-operating state $\phi_{OFF}$ (standby state). In this state, the proximity detection circuit 30 operates so as to monitor whether or not the user's finger is in proximity. When detecting that the user's finger is in proximity at the time point t1, the enable signal EN is asserted. Upon detecting such proximity, a part of the electrostatic capacitance detection circuit 20 is switched from the non-operating state $\phi_{OFF}$ to the operating state $\phi_{ON}$. In this state, the operation of the touch sensor is initiated.

The above is the operation of the display apparatus 4 shown in FIG. 1. Before the time point t0, the current consumption of the electrostatic capacitance detection circuit 20 is substantially zero. Instead, the proximity detection circuit 30 requires current consumption. The current consumption of the proximity detection circuit 30 is sufficiently lower than the current consumption required by the electrostatic capacitance detection circuit 20 in the operating state $\phi_{ON}$. Thus, such an arrangement is capable of dramatically reducing the overall current consumption as compared with the comparison technique shown in FIG. 2B.

Figure 3A:
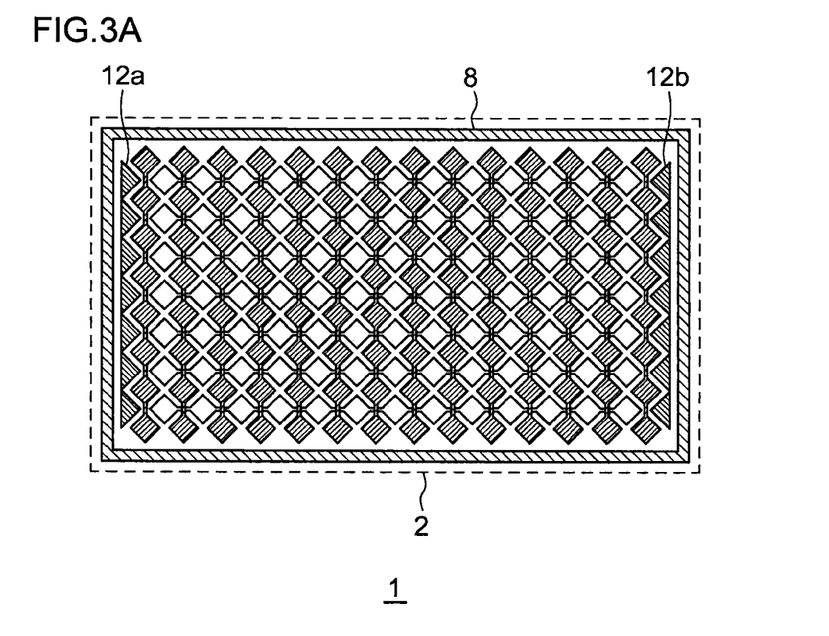
FIGS. 3A and 3B are external views of the electronic device shown in FIG. 1 and the electronic device according to the comparison technique, respectively.
Figure 3B:
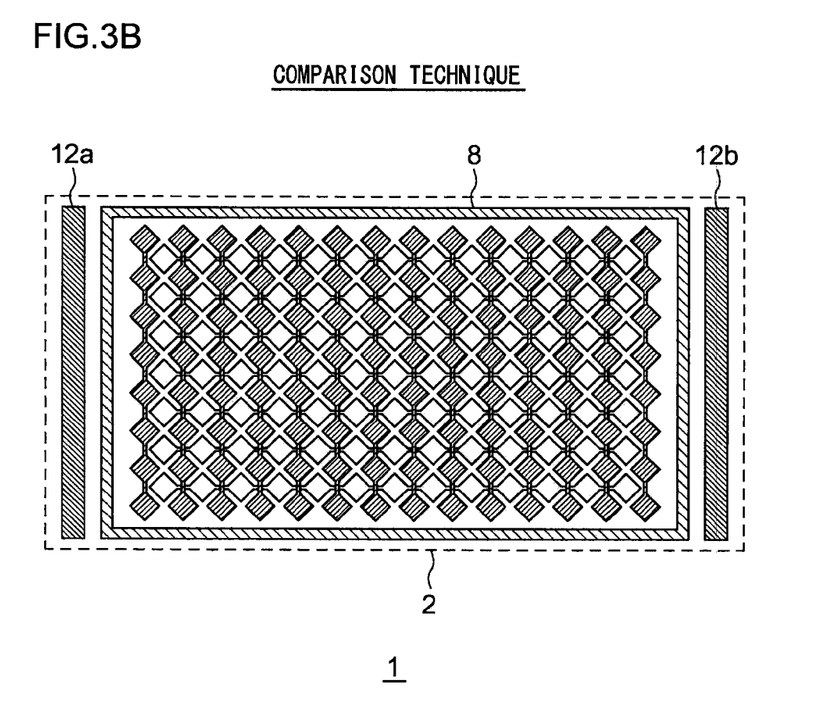

FIGS. 3A and 3B are exemplary external views of the electronic device 1 shown in FIG. 1 and the electronic device 1 according to the comparison technique, respectively. The electronic device 1 shown in FIG. 3B according to the comparison technique includes the proximity sensor electrode pair 12 arranged in a region adjacent to the display panel 8 on a printed circuit board. In such a configuration, a casing 2 indicated by the broken line is required to have a greater size than that of the display. In other words, in such a configuration, a display that can be mounted on the casing 2 having a given size is required to have a smaller size. In a case in which an optical proximity sensor is employed, there is also a need to arrange such an optical sensor in the frame region of the casing. Accordingly, such an arrangement also has the same problem.

In contrast, with the electronic device 1 according to the embodiment, the casing 2 can have a compact size that is approximately the same as that of the display panel 8, as shown in FIG. 3A. That is to say, such an arrangement provides an advantage in that the size of the required frame region is small. In other words, in such an arrangement, a display that can be mounted on the casing 2 having a given size is allowed to have a greater size than that in the configuration shown in FIG. 3B.

Description has been made regarding the present invention with reference to the embodiments. The above-described embodiments have been described for exemplary purposes only, and are by no means intended to be interpreted restrictively. Rather, various modifications may be made by making various combinations of the aforementioned components or processes. Description will be made below regarding such modifications.

Description has been made in the embodiment regarding an arrangement in which the proximity sensor electrode pair 12 is arranged on both edges of the display panel 8. However, the present invention is not restricted to such an arrangement.

Figure 4:
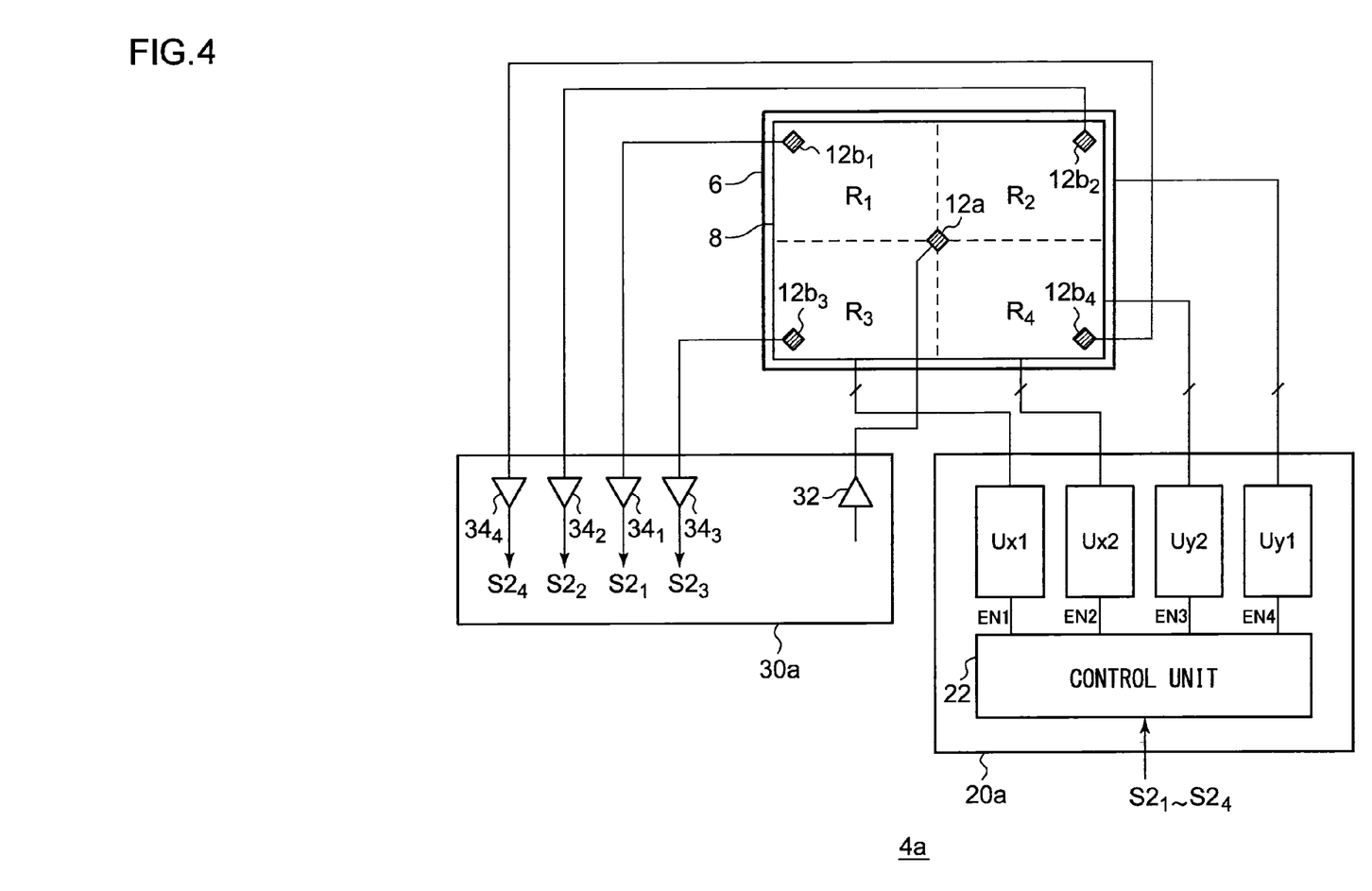
FIG. 4 is a diagram which shows a configuration of a display apparatus according to a modification.

FIG. 4 is a diagram which shows a configuration of a display apparatus 4a according to a modification. In FIG. 4, the multiple sensor electrodes are not shown. With the display apparatus 4a shown in FIG. 4, the display panel 8 is partitioned into multiple regions. It should be noted that the display panel 8 is virtually partitioned into multiple regions, and is not physically partitioned into these multiple regions. For example, the display panel 8 is partitioned into four regions $R_1$ through $R_4$, each having two rows and two columns. With such an arrangement, four proximity sensor electrode pairs $12_1$ through $12_4$ are respectively provided for the multiple regions $R_1$ through $R_4$.

The four proximity sensor electrode pairs $12_1$ through $12_4$ may share a single electric field generating electrode 12a. In this case, the electric field generating electrode 12a should be arranged at the center of the four regions $R_1$ through $R_4$. Also, the electric field detection electrodes $12b_1$ through $12b_4$ may be severally arranged in the vicinity of the respective corners of the four regions $R_1$ through $R_4$ that are opposite to the electric field generating electrode 12a.

A proximity detection circuit 30a uses the four proximity sensor electrode pairs $12_1$ through $12_4$ to judge whether or not the user's finger is in proximity for each of the four regions $R_1$ through $R_4$. The driver 32 supplies a driving signal to the electric field generating electrode 12a. Sensor amplifiers $34_1$ through $34_4$ monitor the electrical states of the respective electric field detection electrodes $12b_1$ through $12b_4$. The sensor amplifiers $34_1$ through $34_4$ generate respective detection signals $S2_1$ through $S2_4$ which respectively indicate whether or not the user is in proximity to the regions $R_1$ through $R_4$.

The electrostatic capacitance detection circuit 20a executes the electrostatic capacitance detection processing only for the sensor electrodes that correspond to a region in the vicinity of the region where it has been detected that the user is in proximity. The detection processing is skipped for the other sensor electrodes.

Specifically, the electrostatic capacitance detection circuit 20a includes multiple processing units Ux1, Ux2, Uy1, and Uy2, which respectively correspond to the multiple regions $R_1$ through $R_4$, and each of which is independently switchable between the operating state and the non-operating state. The processing unit Ux1 is connected to the multiple X electrodes 10x formed in the regions $R_1$ and $R_3$, and detects the electrostatic capacitance that occurs at each of these X electrodes 10x. The processing unit Ux2 is connected to the multiple X electrodes 10x formed in the regions $R_2$ and $R_4$, and detects the electrostatic capacitance that occurs at each of these X electrodes 10x. The processing unit Uy1 is connected to the multiple Y electrodes 10y formed in the regions $R_1$ and $R_2$, and detects the electrostatic capacitance that occurs at each of these Y electrodes 10y. The processing unit Uy2 is connected to the multiple Y electrodes 10y formed in the regions $R_3$ and $R_4$, and detects the electrostatic capacitance that occurs at each of these Y electrodes 10y.

Figure 5:
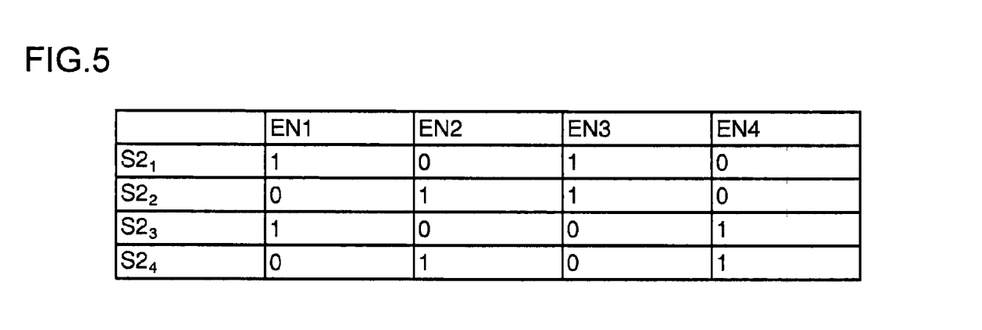
FIG. 5 is a table showing the relation between the detection signals and the control signals in the display apparatus shown in FIG. 4.

The processing units Ux1, Ux2, Uy1, and Uy2 included in the electrostatic capacitance detection circuit 20a are each configured to be switchable between the operating state and the non-operating state according to whether or not the user is in proximity to the corresponding region. Specifically, the processing units Ux1, Ux2, Uy1, and Uy2 each switch between the operating state and the non-operating state in response to respective control signals EN1 through EN4 input to the respective processing units. The control unit 22 receives the detection signals $S2_2$ through $S2_4$, and generates the control signals EN1 through EN4 to be supplied to the respective processing units Ux1, Ux2, Uy1, and Uy2, based upon the detection signals $S2_2$ through $S2_4$ thus received, thereby controlling the state of each processing unit. For example, when the control signal EN1 is "1", the processing unit Ux1 is set to the operating state. FIG. 5 is a table showing the relation between the detection signals $S2_1$ through $S2_4$ and the control signals EN1 through EN4. The control unit 22 stores the table shown in FIG. 5.

That is to say, when it is detected that the user is in proximity to a given region, the control unit 22 sets the processing unit that corresponds to the sensor electrodes that belong to this region to the operating state. For example, when it is detected that the user is in proximity to the region $R_1$, the processing units Ux1 and Uy1 are set to the operating state, and other processing units Ux2 and Uy2 are set to the non-operating state.

With the display apparatus 4 shown in FIG. 1, in the operating state $\phi_{ON}$, detection processing must be performed for all the sensor electrodes 10 of the entire display panel 8. In contrast, with the display apparatus 4a shown in FIG. 4, in the operating state $\phi_{ON}$, the detection processing is performed for only the sensor electrodes 10 in a region where the user's finger is in proximity, thereby providing further reduced current consumption.

Furthermore, by arranging the four proximity sensor electrode pairs $12_1$ through $12_4$ as shown in FIG. 4, and by providing the single electric field generating electrode 12a as a shared electric field generating electrode, such an arrangement requires only a single driver 32 used to supply the driving signal to the electric field generating electrode 12a. Thus, such an arrangement has an advantage in that the circuit and the signal processing are configured in a simple manner.

It should be noted that description has been made with reference to FIG. 4 regarding an arrangement in which the display panel 8 is partitioned into four regions. However, the number of the partitioned regions is not restricted in particular, and may be determined as desired.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

The invention claimed is:

1. A display apparatus furnished with a touch sensor, comprising:
    a display module having a touch sensor comprising: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel;
    an electrostatic capacitance detection circuit configured to detect change in the electrostatic capacitance that occurs at each of the plurality of sensor electrodes according to being touched by the user so as to detect a position touched by the user; and a proximity detection circuit configured to detect change in the electric field generated between the proximity sensor electrode pair, which corresponds to the user being in proximity thereto, so as to detect the user being in proximity to the display panel, wherein the electrostatic capacitance detection circuit is configured to have at least a component that is switchable between an operating state and a non-operating state, wherein, when detecting the proximity of the user by means of the proximity detection circuit, said at least one component transits from the non-operating state to the operating state, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes;

wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel;

vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row;

the plurality of sensor electrodes are arranged such that radii of sensor electrodes in a column of the plurality of columns are collinear with an imaginary line running through centers of the sensor electrodes in the column; and wherein the electric field generating electrode and a first column of sensor electrodes adjacent to the electric field generating electrode are arranged such that the vertices of the first plurality of approximately triangular shapes opposite to the bases are interposed between sides of adjacent sensor electrodes of the first column of sensor electrodes.

2. A display apparatus furnished with a touch sensor, comprising:

a display module having a touch sensor comprising: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel;

an electrostatic capacitance detection circuit configured to detect change in the electrostatic capacitance that occurs at each of the plurality of sensor electrodes according to being touched by the user so as to detect a position touched by the user; and a proximity detection circuit configured to detect change in the electric field generated between the proximity sensor electrode pair, which corresponds to the user being in proximity thereto, so as to detect the user being in proximity to the display panel, wherein the electrostatic capacitance detection circuit is configured to have at least a component that is switchable between an operating state and a non-operating state, wherein, when detecting the proximity of the user by means of the proximity detection circuit, said at least one component transits from the non-operating state to the operating state, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes;

wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel;

vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row;

the plurality of sensor electrodes are arranged such that radii of sensor electrodes in a column of the plurality of columns are collinear with an imaginary line running through centers of the sensor electrodes in the column; and wherein the electric field detection electrode and a second column of sensor electrodes adjacent to the electric field detection electrode are arranged such that the vertices of the second plurality of approximately triangular shapes opposite to the bases are interposed between sides of adjacent sensor electrodes of the second column of sensor electrodes.

3. An electronic device comprising a display apparatus furnished with a touch sensor, wherein the display apparatus comprises:

a display module having a touch sensor comprising: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel;

an electrostatic capacitance detection circuit configured to detect change in the electrostatic capacitance that occurs at each of the plurality of sensor electrodes according to being touched by the user so as to detect a position touched by the user; and a proximity detection circuit configured to detect change in the electric field generated between the proximity sensor electrode pair, which corresponds to the user being in proximity thereto, so as to detect the user being in proximity to the display panel, wherein the electrostatic capacitance detection circuit is configured to have at least a component that is switchable between an operating state and a non-operating state, wherein, when detecting the proximity of the user by means of the proximity detection circuit, said at least one component transits from the non-operating state to the operating state, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes;

wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel; and vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row; and the plurality of sensor electrodes are arranged such that radii of sensor electrodes in a column of the plurality of columns are collinear with an imaginary line running through centers of the sensor electrodes in the column; and wherein the electric field generating electrode and a first column of sensor electrodes adjacent to the electric field generating electrode are arranged such that the vertices of the first plurality of approximately triangular shapes opposite to the bases are interposed between sides of adjacent sensor electrodes of the first column of sensor electrodes.

4. An electronic device comprising a display apparatus furnished with a touch sensor, wherein the display apparatus comprises:

a display module having a touch sensor comprising: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel;

an electrostatic capacitance detection circuit configured to detect change in the electrostatic capacitance that occurs at each of the plurality of sensor electrodes according to being touched by the user so as to detect a position touched by the user; and a proximity detection circuit configured to detect change in the electric field generated between the proximity sensor electrode pair, which corresponds to the user being in proximity thereto, so as to detect the user being in proximity to the display panel, wherein the electrostatic capacitance detection circuit is configured to have at least a component that is switchable between an operating state and a non-operating state, wherein, when detecting the proximity of the user by means of the proximity detection circuit, said at least one component transits from the non-operating state to the operating state, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes;

wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel; and vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row; and the plurality of sensor electrodes are arranged such that radii of sensor electrodes in a column of the plurality of columns are collinear with an imaginary line running through centers of the sensor electrodes in the column; and wherein the electric field detection electrode and a second column of sensor electrodes adjacent to the electric field detection electrode are arranged such that the vertices of the second plurality of approximately triangular shapes opposite to the bases are interposed between sides of adjacent sensor electrodes of the second column of sensor electrodes.

5. A control circuit for a display module furnished with a touch sensor, wherein the display module comprises: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel, and configured to generate an electric field between these two electrodes, wherein the control circuit comprises an electrostatic capacitance detection circuit configured to detect change in the electrostatic capacitance that occurs at each of the plurality of sensor electrodes so as to detect a position touched by a user, and comprising at least a component that is switchable between an operating state and a non-operating state, wherein the electrostatic capacitance detection circuit is connected to a proximity detection circuit configured to detect the user being in proximity to the display panel by monitoring change in the electric field generated between the proximity sensor electrode pair, wherein said at least one component of the electrostatic capacitance detection circuit is configured to switch from the non-operating state to the operating state upon detection by means of the proximity detection circuit that the user is in proximity thereto, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes; and wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel;

vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row;

the plurality of sensor electrodes are arranged such that radii of sensor electrodes in a column of the plurality of columns are collinear with an imaginary line running through centers of the sensor electrodes in the column; and wherein the electric field generating electrode and a first column of sensor electrodes adjacent to the electric field generating electrode are arranged such that the vertices of the first plurality of approximately triangular shapes opposite to the bases are interposed between sides of adjacent sensor electrodes of the first column of sensor electrodes.

6. A control circuit for a display module furnished with a touch sensor, wherein the display module comprises: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel, and configured to generate an electric field between these two electrodes, wherein the control circuit comprises an electrostatic capacitance detection circuit configured to detect change in the electrostatic capacitance that occurs at each of the plurality of sensor electrodes so as to detect a position touched by a user, and comprising at least a component that is switchable between an operating state and a non-operating state, wherein the electrostatic capacitance detection circuit is connected to a proximity detection circuit configured to detect the user being in proximity to the display panel by monitoring change in the electric field generated between the proximity sensor electrode pair, wherein said at least one component of the electrostatic capacitance detection circuit is configured to switch from the non-operating state to the operating state upon detection by means of the proximity detection circuit that the user is in proximity thereto, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes; and wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel;

vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row;

the plurality of sensor electrodes are arranged such that radii of sensor electrodes in a column of the plurality of columns are collinear with an imaginary line running through centers of the sensor electrodes in the column; and wherein the electric field detection electrode and a second column of sensor electrodes adjacent to the electric field detection electrode are arranged such that the vertices of the second plurality of approximately triangular shapes opposite to the bases are interposed between sides of adjacent sensor electrodes of the second column of sensor electrodes.

7. An electronic device comprising a control circuit, wherein the display module comprises: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel, and configured to generate an electric field between these two electrodes, wherein the control circuit comprises an electrostatic capacitance detection circuit configured to detect change in the electrostatic capacitance that occurs at each of the plurality of sensor electrodes so as to detect a position touched by a user, and comprising at least a component that is switchable between an operating state and a non-operating state, wherein the electrostatic capacitance detection circuit is connected to a proximity detection circuit configured to detect the user being in proximity to the display panel by monitoring change in the electric field generated between the proximity sensor electrode pair, wherein said at least one component of the electrostatic capacitance detection circuit is configured to switch from the non-operating state to the operating state upon detection by means of the proximity detection circuit that the user is in proximity thereto, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes; and wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel;

vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row;

the plurality of sensor electrodes are arranged such that radii of sensor electrodes in a column of the plurality of columns are collinear with an imaginary line running through centers of the sensor electrodes in the column;

wherein the electric field generating electrode and a first column of sensor electrodes adjacent to the electric field generating electrode are arranged such that the vertices of the first plurality of approximately triangular shapes opposite to the bases are interposed between sides of adjacent sensor electrodes of the first column of sensor electrodes.

8. An electronic device comprising a control circuit, wherein the display module comprises: a display panel; a plurality of sensor electrodes formed in a region where they overlap the display panel, and each having an electrostatic capacitance that changes according to a state of being touched by a user; and a proximity sensor electrode pair comprising an electric field generating electrode and an electric field detection electrode each formed as a transparent electrode in a region where they overlap the display panel, and configured to generate an electric field between these two electrodes, wherein the control circuit comprises an electrostatic capacitance detection circuit configured to detect change in the electrostatic capacitance that occurs at each of the plurality of sensor electrodes so as to detect a position touched by a user, and comprising at least a component that is switchable between an operating state and a non-operating state, wherein the electrostatic capacitance detection circuit is connected to a proximity detection circuit configured to detect the user being in proximity to the display panel by monitoring change in the electric field generated between the proximity sensor electrode pair, wherein said at least one component of the electrostatic capacitance detection circuit is configured to switch from the non-operating state to the operating state upon detection by means of the proximity detection circuit that the user is in proximity thereto, wherein the plurality of sensor electrodes and the proximity sensor electrode pair are formed in the same wiring layer, wherein the electric field generating electrode is formed along a first edge of the display panel, and the electric field generating electrode is positioned between the first edge and one side of the region in which the plurality of sensor electrodes are formed, wherein the electric field detection electrode is formed along a second edge of the display panel that is opposite to the first edge, and the electric field detection electrode is positioned between the second edge and another side of the region in which the plurality of sensor electrodes are formed;

wherein the electric field generating electrode comprises a first plurality of approximately triangular shapes; and wherein the electric field detection electrode comprises a second plurality of approximately triangular shapes;

wherein bases of the first plurality of approximately triangular shapes are proximate to the first edge of the display panel;

vertices of the first plurality of approximately triangular shapes opposite to the bases are proximate to the plurality of sensor electrodes;

bases of the second plurality of approximately triangular shapes are proximate to the second edge of the display panel;

vertices of the second plurality of approximately triangular shapes opposite to the bases are proximate to the plurality of sensor electrodes;

wherein the plurality of sensor electrodes are arranged in a plurality of rows and columns;

each of the plurality of sensor electrodes are formed in an approximately rectangular shape;

the plurality of sensor electrodes are arranged such that radii of sensor electrodes in a row of the plurality of rows are collinear with an imaginary line running through centers of the sensor electrodes in the row;

the plurality of sensor electrodes are arranged such that radii of sensor electrodes in a column of the plurality of columns are collinear with an imaginary line running through centers of the sensor electrodes in the column; and wherein the electric field detection electrode and a second column of sensor electrodes adjacent to the electric field detection electrode are arranged such that the vertices of the second plurality of approximately triangular shapes opposite to the bases are interposed between sides of adjacent sensor electrodes of the second column of sensor electrodes.

* * * * *